United States Patent [19]

Altstetter et al.

[11] 4,246,464
[45] Jan. 20, 1981

[54] DEVICE FOR WELDING METALLIC HOLLOW BODIES WITH A MAGNETICALLY MOVED ELECTRIC ARC

[75] Inventors: Manfred Altstetter, Wulfertshausen; Norbert Pache; Karel Mazac, both of Augsburg, all of Fed. Rep. of Germany

[73] Assignee: Industrie-Werke Karlsruhe Augsburg Aktiengesellschaft, Fed. Rep. of Germany

[21] Appl. No.: 9,600

[22] Filed: Feb. 5, 1979

[30] Foreign Application Priority Data

Feb. 10, 1978 [DE] Fed. Rep. of Germany ....... 2805562

[51] Int. Cl.³ .............................................. B23K 9/08
[52] U.S. Cl. .................................... 219/123; 219/161
[58] Field of Search ................ 219/123, 158, 160, 161

[56] References Cited

U.S. PATENT DOCUMENTS

| 3,286,706 | 8/1966 | Laming | 219/123 |
| 3,829,806 | 8/1974 | Lathouwers | 336/83 |
| 3,882,299 | 5/1975 | Sciaky | 219/123 X |

FOREIGN PATENT DOCUMENTS 1841959 10/1960 Fed. Rep. of Germany ........... 219/123
2258417 11/1972 Fed. Rep. of Germany .

OTHER PUBLICATIONS

"Magnet Arc Tube Weld Machine", Brochure of Falstrom Co., N.J., 2/73.

Primary Examiner—E. A. Goldberg
Attorney, Agent, or Firm—McGlew and Tuttle

[57] ABSTRACT

A device for welding two metallic hollow bodies together in end-to-end connection by means of an electric arc moved by the effect of an external magnetic field along the welding joint, comprises, clamping means engaged with the bodies to clamp them in end-to-end relationship with the respective ends to be joined disposed closely adjacent. In addition, a magnetic coil is disposed within at least one of the bodies or it is advantageously located with a pole piece disposed in the gap between the two bodies and overlapping each of the bodies so as to produce a magnetic field in the vicinity of the ends to be joined. The pole shoe of the magnet advantageously comprises a pole piece which is conformable to the dimensions of the shape of the welded joint.

3 Claims, 3 Drawing Figures

DEVICE FOR WELDING METALLIC HOLLOW BODIES WITH A MAGNETICALLY MOVED ELECTRIC ARC

FIELD AND BACKGROUND OF THE INVENTION

This invention relates to welding devices in general and, in particular, to a new and useful device for welding metallic hollow bodies together with a magnetically moved electric arc and to a method of effecting the welding.

DESCRIPTION OF THE PRIOR ART

Welding with a magnetically moved electric arc is a method on which the design of first fully automatic machines in production has been based and proven to be satisfactory. This method is an ingenious completion of the flash, upset, continuous, TIG, MIG, MAG and friction butt welding processes and is mostly applied to tubes or workpieces having a tubular extension. However, it is not required that the pieces be rotationally symmetrical.

The object of an optimum investment, i.e., a minimum expenditure with a maximum economic effect can only be obtained if the method is considered to be incorporated in the above-mentioned techniques. The advantages of the method are clear. They are of both economic and technological nature and represent a synthesis of the hitherto known advantages of resistance arc welding and friction welding. In a welding operation with a magnetically moved arc, the following two arrangements are possible in principle:

(a) welding with an electric arc moving between the workpieces to be joined; and
(b) welding with an electric arc moving between a non-fusing auxiliary electrode and the workpieces.

The migration or circular motion of the electric arc about the front face of the workpieces is based on the fundamental laws of electricity. Any flow of current is accompanied by a magnetic field, and with a circular conductor, for reasons of symmetry, the lines of force of the field form concentric circles. An electric arc may be considered approximately a circular conductor. If it is placed in an additional, stationary magnetic field, the lines of force of the two fields will superpose each other. Since, for energetic reasons, the lines of magnetic force always tend to shorten and, on the other hand, the additional magnetic field is locally fixed, the electric arc is subject to a magnetic force. The direction of this force may be found, for example, by using the three finger rule.

In order to produce a stationary magnetic field, it is known from German Patent No. 23 21 070 to arrange a plurality of unipolar individual magnets in the welding plane. This same patent also teaches the uniting of the magnetic field of the individual magnets in a magnetizable ring surrounding the weld joint closed upon itself.

As a further development of German Pat. No. 23 21 070, German Patent Application Ser. No. P 27 29 203.1 teaches the conformation of the pole surface facing the weld joint of the individual magnets to the shape and line of the welding seam. This application further indicates that the basic idea of a conformable pole surface may in itself be applied if a single magnet is employed.

Both the mentioned patent and the mentioned application start from the implied condition that a sufficiently large free space is available for the individual magnets as well as for the fixtures in the area of the line of weld of the workpieces to be welded. There are cases of application, however, where such conditions are absent.

SUMMARY OF THE INVENTION

The present invention is directed to an improvement and modification of a welding device with respect to the welding of hollow bodies, making it unnecessary to observe any conditions limiting the application of the underlying welding method. To this end, it is provided that the magnetic field is produced by a magnet coil accommodated in the interior of the hollow body.

Accordingly, an object of the present invention is to provide a device for welding two metallic hollow bodies together in end-to-end connection by means of an electric arc which is moved by the effect of an external magnetic field along the welding joint, characterized in that the magnetic field is produced by a magnetic coil accommodated in the interior of the hollow body.

A further object of the invention is to provide a device for guiding a welding arc for joining two tubular bodies together in end-to-end interengagement which comprises a magnetic coil including a core having a winding therearound and a pole piece at the end of the winding which is disposed between the two bodies in the area of the joint to be formed.

Another object of the invention is to provide a method of forming a welded joint between two hollow bodies which comprises clamping the hollow bodies so that they are disposed with respective ends facing each other in closely spaced relationship, disposing a magnetic coil within the hollow body and producing a magnetic field with the coil, and moving an electric arc to weld the two bodies together in accordance with the magnetic field which is produced along the welding joint.

In accordance with the invention, a device for welding the tubular ends of two workpieces together in end-to-end connection by means of an electric arc which circulates under the effect of an electromagnetic field along a closed welding path in a gap between the two workpieces is provided. The device includes magnetic coil means for producing the electromagnetic field of a type having an elongated central member supporting a pole shoe extending across one end of the central member and a winding around the central member. The magnetic coil means is adopted so that the periphery of the pole shoe is disposed adjacent to the gap. A centering member is provided which has a tubular bore adopted to receive the magnetic bore means. The tubular bore terminates in a rim portion which is designed to center and seat the tubular end of one of the workpieces to be welded. The elongated central member is disposed within the tubular bore in a spaced relationship with the centering member, and means for clamping the workpieces relative to the centering member to form a consistent magnetic circuit is provided.

A further object of the invention is to provide a device for welding two metallic hollow bodies together which is simple in design, rugged in construction and economical to manufacture.

The various features of novelty which characterize the invention are pointed out with particularity in the claims annexed to and forming a part of this disclosure. For an understanding of the invention, its operating advantages and specific objects attained by its uses,

DESCRIPTION OF THE PREFERRED EMBODIMENT

Figure 1:
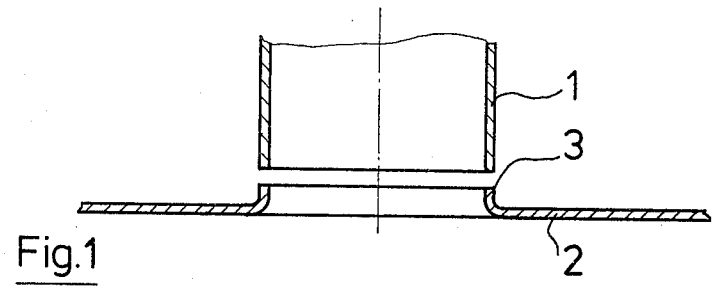
FIG. 1 is a partial axial sectional view of two hollow bodies which are to be joined together by welding.

Referring to the drawing in particular, in accordance with the showing of FIG. 1, a tube 1 is to be welded to an extensive flat part or tube plate 2. If it is supposed that a hole is punched out in this tube plate which corresponds to the diameter of the tube 1 and in a manner such that a low collar 3 is formed, the arc is drawn between the collar and the tube length and is conducted radially therearound.

Figure 2:
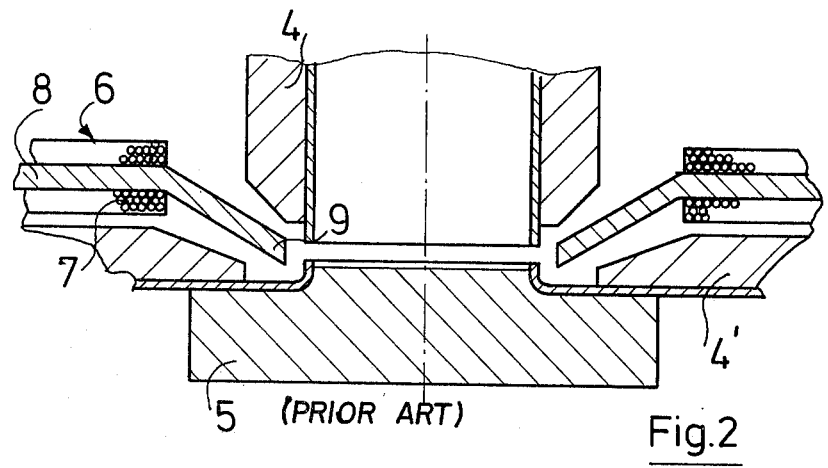
FIG. 2 is a view showing the two hollow bodies clamped in position and with a magnetic field being generated in accordance with the Prior Art.

In the prior art welding technique based on a magnetically moved electric arc, the workpieces to be welded together are fixed in a welding machine by means of clamping elements, as shown in FIG. 2 and, at the same time, they are aligned and centered. The clamping elements are shown at 4 and 4', with the centering element shown at 5.

Now, due to the specific shape of the workpieces to be welded to each other, the design of the magnet must also be specific and thus expensive. A magnet 6, as shown, comprises a ferromagnetic basic body 8 which is surrounded by a winding 7 of conducting material, preferably, copper. According to the teaching of German Pat. No. 23 21 070, the winding is of such direction that the end of magnet 6 facing the welding joint is a magnetic south pole.

In view of the low collar 3 of the flat part, the basic body 8 of the magnet must be extended toward the welding joint, to obtain a sufficiently strong magnetic field for moving the arc, and it is provided with an angled finger 9 which is angled relative to the plane of the magnet, as shown. Thus, the magnetic force is transferred to the arc by means of this finger 9 reaching close up to the weld seam.

It will be readily understood that such specially shaped magnets are usable only for the specific purpose and are expensive in the long run. The clamping elements must also be conformed to, or reworked for, the actual application.

Figure 3:
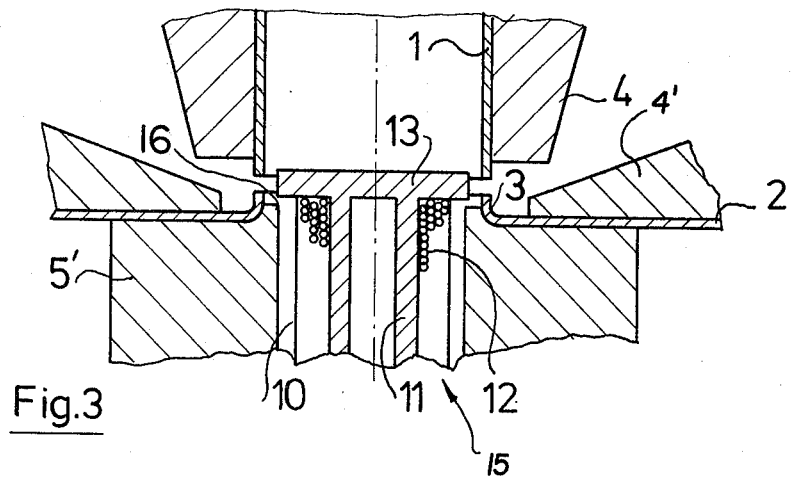
FIG. 3 is a view similar to FIG. 2 but having a magnetic coil disposed in accordance with the present invention.

The concept in accordance with the invention, shown in FIG. 3, is a substantial improvement, even though it is explicitly pointed out that this concept can only be applied to hollow bodies to be welded.

The basic design as to clamping elements 4 and 4' and centering 5 is the same as in FIG. 2. While clamping elements 4 and 4' of the most common kind may be employed, the centering element 5', in contra-distinction to the device of FIG. 2, is centrally enlarged by boring to such an extent that only a small projecting portion is left having to center flat part 2.

In accordance with the invention, the bore 10 of centering element 5' accommodates a magnet 15 comprising a basic body 11 of a magnetizable material and a conductor 12, such as copper, wound thereon in such a position that the end of the magnet 15 is about flush with the level of the weld seam. This end supports a pole shoe 13 which is also made of a magnetizable material. A rim portion 16 is formed at one end of the bore 10.

In accordance with the teaching of the invention, pole shoe 13 is dimensioned so that its outer circumference reaches close up to the weld seam, i.e., to the inside surface of the tube 1 to be welded on. With the magnet coil energized, the magnetic field is thus brought through the pole shoe closer to the weld seam and the arc, to produce its effect on the latter. In order to prevent a flash-over of the arc to the pole shoe and thus failures in the weld, it is advisable to coat the pole shoe in the marginal zone facing the weld seam with an insulating material.

The substantial improvement obtained with the invention relative to the prior art technique based on a magnetically moved electric arc is the concept of the magnet coil with the pole shoe accommodated in the interior of the hollow body to be welded. This makes it possible to weld different diameters and shapes after merely exchanging the pole shoe, without particular concern about the design of the magnets and clamping elements and the fixing of the workpieces.

Further advantages of the inventive interior magnet coil are as follows:

(a) the costs of manufacture are more favorable;
(b) better cooling possibilities; and
(c) a stronger magnetic field with the same amperage.

In addition, advantageously and with a corresponding design, the outer body of the coil may be used as a centering element for the workpieces to be welded. A further particular advantage of the inventive internal coil is that even parts positioned very closely to each other may be welded together.

While a specific embodiment of the invention has been shown and described in detail to illustrate the application of the principles of the invention, it will be understood that the invention may be embodied otherwise without departing from such principles.

What is claimed is:

1. A device for welding the tubular ends of two workpieces together in end-to-end connection by means of an electric arc which circulates under the effect of an electromagnetic field along a closed welding path in a gap between the two workpieces, comprising magnetic coil means for producing the electromagnetic field of the type having an elongated central member supporting a pole shoe extending across one end of the central member and a winding around said central member, said magnetic coil means being adapted so that the periphery of said pole shoe is disposed adjacent to the gap, a centering member having a tubular bore adapted to receive said magnetic coil means, said tubular bore of said centering member terminating in a rim portion for centering and seating the tubular end of one of the workpieces to be welded, said elongated central member being disposed within said tubular bore in spaced relationship with said centering member and means for clamping said workpieces relative to said centering member to form a consistent magnetic circuit.

2. A device according to claim 1, wherein said pole shoe has a dimension and shape conforming substantially to the area to be welded.

3. A device for the internal welding of a tube and a tubular collar of a tube plate together in end-to-end connection comprising a centering member having a tubular bore and a rim portion formed at one end of said tubular bore adapted to supportingly receive and centering said tubular collar of said tube plate, magnetic coil means for producing a magnetic field along a welding path in a gap between the ends of the tube plate and tube to be welded, said magnetic coil means including an elongated central member supporting a pole shoe extending across one end of the central member and a winding disposed around said central member, said pole shoe being dimensioned so that the periphery thereof is disposed adjacent to the gap, said elongated central member being disposed in coaxial spaced relationship within said tubular bore, and means for clamping said tube and tube plate relative to said centering member to form a consistent magnetic circuit.

* * * * *